United States Patent [19]
Gillard et al.

[11] Patent Number: 5,560,730
[45] Date of Patent: Oct. 1, 1996

[54] SCAFFOLD SYSTEM

[75] Inventors: Raymond W. Gillard, Fort Saskatchewan; Douglas W. Lindstrom, Edmonton; Hung B. Quach, Edmonton; Michael G. Blum, Calgary; Kevin K. Gray, Edmonton; Bill K. Jang, Edmonton, all of Canada

[73] Assignee: Scaffold Connection Corporation, Fort Saskatchewan, Canada

[21] Appl. No.: 470,191

[22] Filed: Jun. 6, 1995

Related U.S. Application Data

[62] Division of Ser. No. 234,801, Apr. 28, 1994.

[51] Int. Cl.⁶ .................. E04G 7/24; F16B 7/04
[52] U.S. Cl. ............... 403/294; 403/49; 403/263; 403/261; 403/256; 182/179
[58] Field of Search ............... 182/179, 46; 428/34.7, 428/36.91; 403/49, 294, 292, 295, 261, 263, 260, 256; 52/638

[56] References Cited

U.S. PATENT DOCUMENTS

| | | |
|---|---|---|
| 3,225,862 | 12/1965 | Fink . |
| 3,318,413 | 5/1967 | Werner . |
| 3,379,220 | 4/1968 | Kiuchi et al. . |
| 3,542,079 | 11/1970 | Kelly . |
| 3,566,992 | 3/1971 | Berger . |
| 3,674,110 | 7/1972 | Cooke ................... 182/46 |
| 3,998,499 | 12/1976 | Chiarotto . |
| 4,044,523 | 8/1977 | Layher .................. 52/638 |
| 4,244,760 | 1/1981 | Smith ................... 182/46 X |
| 4,369,859 | 1/1983 | Smits . |
| 4,493,578 | 1/1985 | D'Alessio . |
| 4,496,029 | 1/1985 | Kuroda . |
| 4,586,842 | 5/1986 | Puccinelli . |
| 4,587,786 | 5/1986 | Woods . |
| 4,715,474 | 12/1987 | Wehmeyer . |
| 4,742,890 | 5/1988 | de Blauw . |
| 4,819,402 | 4/1989 | Schneider . |
| 4,840,513 | 6/1989 | Hackett . |
| 4,852,691 | 8/1989 | Bruno . |
| 4,856,616 | 8/1989 | Anderson . |
| 4,867,274 | 9/1989 | Langer ................. 182/179 |
| 4,984,654 | 1/1991 | Anderson . |
| 5,005,280 | 4/1991 | Wallick . |
| 5,324,558 | 6/1994 | Muto et al. . |

FOREIGN PATENT DOCUMENTS

| | | |
|---|---|---|
| 1005841 | 2/1977 | Canada . |
| 1018215 | 9/1977 | Canada . |
| 1170694 | 7/1984 | Canada . |
| 0154850 | 9/1985 | European Pat. Off. . |
| 0203857 | 12/1986 | European Pat. Off. . |
| 2288199 | 5/1976 | France . |
| 2453254 | 12/1980 | France ................. 182/179 |
| 1534886 | 5/1969 | Germany . |
| 2031959 | 1/1972 | Germany . |
| 425825 | 11/1949 | Italy ..................... 52/638 |

(List continued on next page.)

OTHER PUBLICATIONS

Martin, "Pultrusion and Pulforming", *Modern Plastics*, pp 288–89, Oct. 1991.

Brochure, "Layher All Around Scaffolding" pp 1–6 (undated).

"Pultrusion and Pulforming" Modern Plastics Encyclopedia Mid Oct. '92 J. Martin.

*Primary Examiner*—Anthony Knight
*Attorney, Agent, or Firm*—Bennett Jones Verchere

[57] ABSTRACT

A scaffold system has a plurality of vertical members and a plurality of cross members connected by couplings. The vertical members and cross members are formed of polymeric matrix reinforced with glass and polymeric fibres. Each coupling includes a pair of annular flanges, positioned on the vertical members in a spaced apart relation to form a groove. Each flange is formed with a least one aperture to accept a lock pin which extends across the groove. In use, the lock pin locks an adapted end of a cross member in the groove by extending through the apertures of the flanges and an aperture in the adapted end of the cross member.

19 Claims, 5 Drawing Sheets

U.S. PATENT DOCUMENTS

| | | | |
|---|---|---|---|
| 1761987 | 9/1992 | U.S.S.R. | 403/49 |
| 1487302 | 9/1977 | United Kingdom . | |
| 1489411 | 10/1977 | United Kingdom . | |
| 1554448 | 10/1979 | United Kingdom . | |
| 2028961 | 3/1980 | United Kingdom . | |
| 1565658 | 4/1980 | United Kingdom . | |
| 2093942 | 9/1982 | United Kingdom . | |
| 2169641 | 7/1986 | United Kingdom . | |
| 2215262 | 9/1989 | United Kingdom . | |
| 2222793 | 3/1990 | United Kingdom . | |
| WO91/00466 | 1/1991 | WIPO . | |
| 9301380 | 1/1993 | WIPO . | |
| 9308421 | 4/1993 | WIPO . | |
| WO93/15292 | 8/1993 | WIPO . | |

SCAFFOLD SYSTEM

This is a divisional of co-pending application Ser. No. 08/234,801, filed on Apr. 28, 1994.

FIELD OF THE INVENTION

The present invention is directed toward a scaffold system, and more particularly a polymeric scaffold system and a coupling member for use in scaffold systems.

BACKGROUND OF THE INVENTION

Scaffold systems are often formed from steel tubes joined together by means of coupling members.

In the scaffolding industry, the possible benefits of plastic tubing over the present steel tube systems have long been known. These benefits include the reduced weight and electrical insulation afforded by the plastic tubing. However, plastic tubing scaffold systems have not been accepted generally.

Coupling members are used with scaffolding tubing in the construction of a scaffold structure. Coupling arrangements as taught in U.S. Pat. Nos. 4,044,523 of Layher, 4,493,578 of D'Alessio, 4,587,786 of Woods and 4,840,513 of Hackett, are exemplary of disc couplers known in the art of scaffold systems. The disc coupling members comprise a single disc with a plurality of apertures formed in the disc to allow the locking of adapters to the disc. The disc of such a coupling member bears the horizontal tensile loads, vertical compressive and shearing loads as well as the bending loads imparted by the horizontal and diagonal members of the scaffold structure. Horizontal tensile loads are supported most directly by the annulus of material exterior to the apertures in the disc. This same annulus and the points of contact between the various parts of the coupler and adapter are responsible for much of the bending strength and stiffness of the coupling.

SUMMARY OF THE INVENTION

A novel plastic tubing scaffold system has now been invented which has a comparable bending stiffness to that of tubular steel currently used in scaffold systems. In addition, the novel scaffold system is electrically insulating as well as from one-fourth to one-third the weight of a steel scaffold tube of comparable size. Further, the novel scaffold system has high corrosion resistance to most common industrial materials, is able to dissipate static electricity, is chemically clean and offers a high degree of flame resistance.

The invention also comprises a coupling having a pair of spaced apart flanges. The coupling distributes the stresses at the connection points in the scaffold system effectively and thereby transfers the loads placed on the horizontal scaffold members to the vertical members of the scaffold system.

In accordance with a broad aspect of the present invention, there is provided a tube for use in scaffold structures comprising a polymeric matrix reinforced with glass and polymeric fibres.

In accordance with another broad aspect of the present invention, there is provided a method for producing a tube for use in scaffolding comprising:

a) forming a glass fibre reinforced polymeric tube; and b) applying a layer of polymeric fibre reinforced polymeric resin to the tube.

Alternatively, in accordance with another aspect of the present invention, the method can include the formation of a of polymeric fibre reinforced polymeric tube and the application of a layer of glass fibre reinforced polymeric resin to the tube.

In accordance with further broad aspect of the present invention, there is provided a scaffold system comprising:

a plurality of vertical members formed from fibre reinforced polymeric resin;

a plurality of cross members formed from fibre reinforced polymeric resin; and, a plurality of couplings for releasably coupling the cross members to the vertical members.

In accordance with a further broad aspect of the present invention, there is provided a coupling for use in a scaffold system to connect cross members to vertical members, the coupling comprising:

a pair of annular flanges for mounting in a spaced apart relation on a vertical member to form a groove therebetween, each flange having formed therein at least one aperture and a lock pin, shaped to extend across the groove and be received in an aperture on each flange, wherein an adapted portion of a cross member can be inserted in the groove and locked into the coupling by means of the lock pin.

DETAILED DESCRIPTION OF THE INVENTION

The scaffold system of the present invention consists of vertical posts or columns (which are termed "standards"). A number of cross members extend from standard to standard, including, horizontal structural members (termed "ledgers"), diagonally oriented members (termed "diagonals") and horizontal supports (termed "transoms"). Horizontal work surfaces (termed "platforms") are supported on the transoms. The standards, ledgers and diagonals come together at common connection points by means of couplings.

The standards and cross members of the present scaffold system are formed entirely from fibre reinforced polymeric resins. To achieve the stiffness for buckling and bending that is required of the members, and to keep the weight of the member low, the inventive cross members and standards are formed from a combination of glass and plastic reinforcing fibres in a binding matrix, such as thermoplastic or thermosetting polymers. The cross members and standards of the present invention are therefore in the preferred embodiment tubing formed of a laminate of glass fibre-filled polymer and polymeric fibre-filled polymer. Preferably, each layer is formed from pultrusion as is described in Martin, J. "Pultrusion and pulforming", *Modern Plastics* pp.288–289 October 1991. The laminate tubing can be manufactured in one operation by pultruding the plastic fibre over a glass tubular pultrusion. One or more layers of randomly oriented fibre layers can-be added to the tube. To enhance the performance of the cross members and standards, they can be coated with a polymeric material to increase their abrasive resistance, corrosion resistance, resistance to UV degradation and also to aid in the dissipation of static electrical charges.

Platforms of various types can be used with the scaffold system of the present invention.

While the scaffold system can be constructed with the use of any suitable coupling arrangement such as is known in the art, a coupling member has been developed exhibiting improved performance over previous coupling systems.

The coupling member rigidly connects the cross members to the standards. The coupling consists of a block of material attached to, or formed integral with, the standard and shaped so as to lock the ends of the cross members to itself. The locking is accomplished by means of a releasable lock pin acting through aligned apertures extending through the coupling and the ends of the cross members.

The coupling comprises a pair of spaced apart annular flanges. The flanges of the coupling can be formed integrally with the standard or be separately positioned on the standard. Where the flanges are positioned separately on the standard, the flanges can be mounted independently on the standard or else mounted on a base cylinder which is, in turn, mounted on the standard. The base cylinder serves to maintain the alignment and spacing of the flanges. It is advantageous to have a coupling mounting arrangement wherein the flanges are formed integrally with a base cylinder. This eases the transmission of force between the different components thereby reducing stresses. For example, any force on the coupling is distributed over the large interface between the base cylinder and standard when it is transmitted to the standard.

A groove having a uniform depth and width is formed between the spaced apart flanges. The groove can be substantially rectangular in shape or, alternatively, can be tapered to be somewhat conical in shape. The ends of the cross members enter and rest in the groove.

Apertures are formed in the flanges to accept a lock pin to lock the ends of the cross members. Preferably, each flange has at least four spaced apart apertures so that tubular members can be connected to extend out in four directions. To ensure that the cross members at a coupling can extend at right angles to each other, the apertures are preferably, equidistantly spaced about the coupling at 90° intervals. There may be additional apertures arranged between these four apertures. Apertures in each of the two flanges are aligned. To enhance the usefulness of the coupling, some or all of the apertures can be formed as short arcs of a circle concentric about the standard. The use of such arcuate apertures permits the ledgers, diagonals and transoms to be attached at varying angles to one another, to permit the scaffold to be built in various desired shapes.

The apertures are each sized and shaped to receive a lock pin for use in locking the cross members to the coupling. The locking pins can be of rectangular cross-section, and sized so that they cannot pivot, or can be of round cross-section to act as pivot points. When apertures form short arcs of a circle around the standard, the locking pins can slide in these arcs.

The ends of the cross members can be shaped to fit within the groove by moulding or pressing and stamping to form the appropriate shape and aperture for attachment in the groove of the coupling. Alternatively, adapters can be inserted in the ends of the cross members to mate with the coupling. Two types of adapters are preferably used, one of which attaches to ledgers, and the other of which attaches to diagonals. The adapters include a head portion for insertion into the groove of the coupling and an outboard portion for attachment to the tubular portion of the cross member. To provide ease of processing and reduced weight, the adapters are preferably constructed in a hollowed form.

The head portion of the adapter fits within the groove and has formed therein an aperture which aligns with the apertures of the flanges. The outboard portion is formed to allow attachment to the tubular portions of the cross members in any suitable way. For example, the outboard portion can be formed as a cup which holds an end of the tubular portion or it can be formed as an insert which fits within the tubular portion. The tubular portion can be mounted on the outboard portion by welding, frictional engagement, adhesives or fasteners.

To provide for the attachment of diagonal cross members, the adapter for such members is preferably constructed with a pivot point. The pivot point can be found between the head portion and outboard portion. Alternatively, the tubular portion can be directly attached at a pivot point to the head portion of an adapter.

The coupling, lock pin and adapters can be formed from various materials such as metallics and moulded polymers. The moulded polymers can contain fibre reinforcements.

These foregoing aspects of the invention, together with other aspects and advantages thereof will be more apparent from the following description of the preferred embodiments thereof, taken in conjunction with the following drawings.

BRIEF DESCRIPTION OF THE DRAWINGS

For a better understanding of the present invention, reference may be made by way of example to the following diagrammatic drawings in which.

DETAILED DESCRIPTION OF THE PREFERRED EMBODIMENTS

Figure 1:
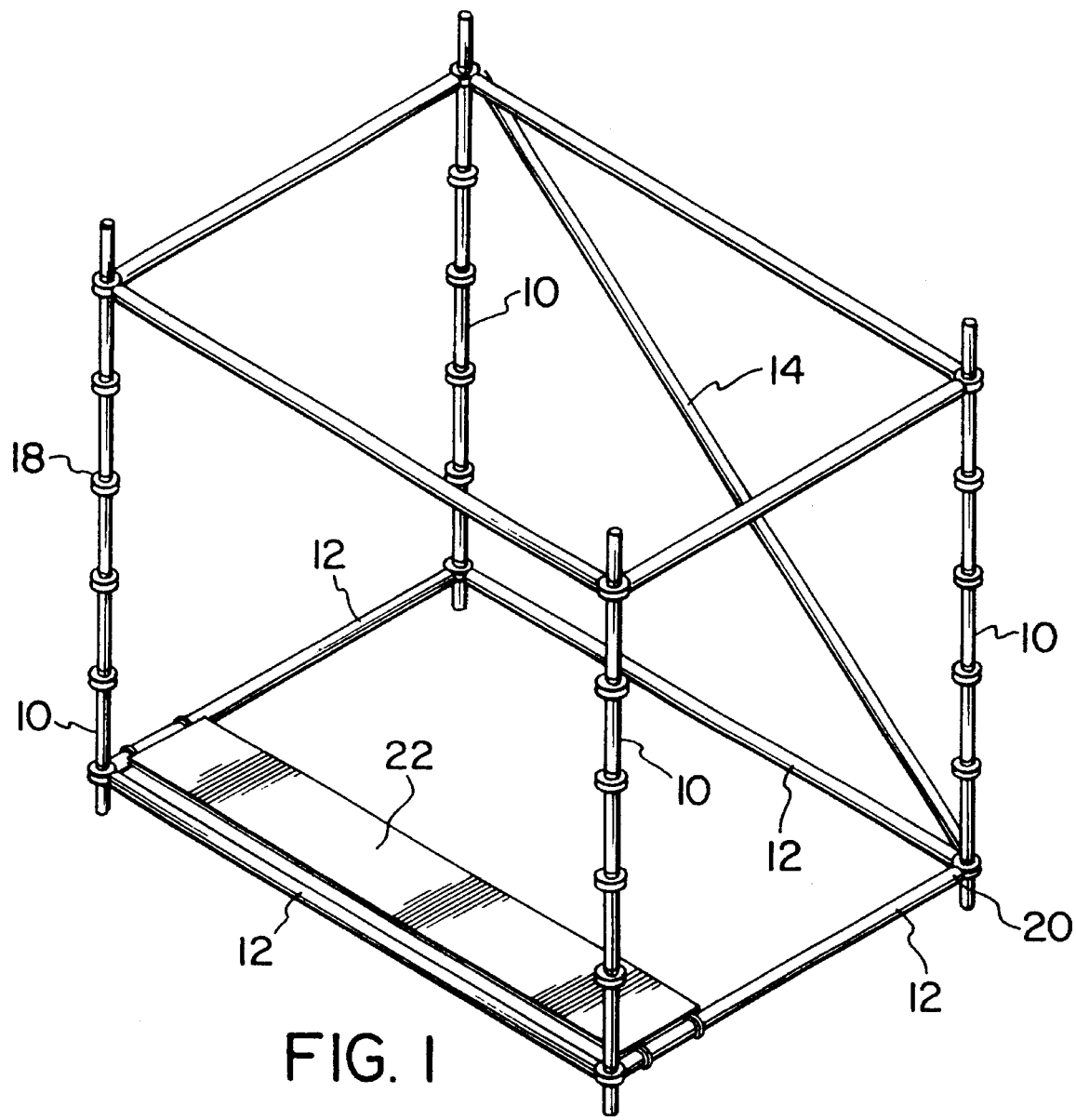
FIG. 1 is a perspective view of a scaffold system of the present invention.

Referring to FIG. 1, the preferred embodiment of the scaffold system of the present invention is shown comprising cross members including standards 10, ledgers 12, diagonals 14 and transoms (not shown). Members 10, 12, and 14 are connected by means of couplings 18. Adapters 20 secure members 10, 12, and 14 to the couplings 18. A suitable work platform 22 is supported between the ledgers 12. In this way, a scaffold structure is constructed by connecting a plurality of members, by means of couplings, and placing platforms at selected locations on the scaffold.

Figure 2:
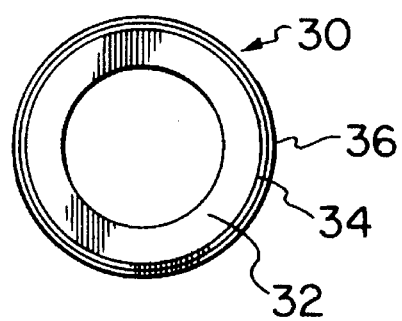
FIG. 2 is a cross-sectional view through the tubing of, the present invention.

In a preferred embodiment, the cross members are comprised of fibre reinforced resins in a particular laminate arrangement. A cross-sectional view of the tubing is shown in FIG. 2. Tubing member 30 is comprised of an inner layer 32 of a matrix containing glass-fibre, an outer layer 34 of a matrix containing polymeric fibre, and a coating 36.

Inner layer 32 preferably contains glass fibres such as E-glass. Preferably, elongated or continuous fibre form E-glass available from Owens Corning Glass Ltd. or PPG Ltd. is used in the formation of the inner layer. The glass fibres, in a suitable volume such as 50 to 85%, and preferably 65 to 70%, are contained in a matrix of thermosetting or thermoplastic polymers such as epoxy or vinyl ester. Preferably an epoxy such as Epon™ 9310 available from Shell Chemical Company or a vinyl ester such as Q6486™ available from Ashland Co. is used.

Outer layer 34 of the tubing is a resin which contains polymeric fibre. Elongated or continuous polymeric fibres such as aromatic polyamide fibres or nonconductive fibres of tensile modulus similar to polyamide fibres can be used in a suitable fibre volume such as 50 to 85%, and preferably a volume of 65 to 70% and, in a matrix of thermosetting or thermoplastic polymers, such as for example spoxy or vinyl ester. In the preferred embodiment, the outer layer 34 is comprised of the para aromatic polyaramid available from Dupont known as KEVLAR™ 49 in a Epon 9310 or Q6486 matrix.

In the preferred embodiment, coating 36 is applied to the outer surface of the tubing. The coating is selected to increase the abrasion resistance and corrosion resistance of the tubing, as well as protecting the tubing from degradation by exposure to ultraviolet radiation. The coating can also aid in the dissipation of static electricity. Suitable coatings include, for example, polyurethane or polyester.

Tubes can be made with varying layer thicknesses. For example, when the thickness of the KEVLAR polyaramid layer is increased relative to the glass layer, the resultant tube has a reduced weight and increased strength and stiffness. To obtain a tube having optimum characteristics of stiffness, weight and cost for use in scaffold systems, outer KEVLAR polyaramid layer 34 has a preferred thickness of about 1 to 2 mm, and most preferably 1.5 mm, while inner E-glass layer 32 is preferably about 2 to 5 mm, and most preferably 3.5 mm, thick. The coating 36 is preferably applied in a layer having a thickness of 0.1 to 1.0 mm. For use in scaffolding, the tube is preferably of circular cross-section and of convenient dimensions having regard to the stresses it is to bear. For example, a suitable tube for typical scaffolding of two or three stories has an outside diameter of 64.0 mm and a weight of 1.63 kg/m.

The laminate tube of the preferred embodiment is preferably produced by simultaneous pultrusion of outer layer 34 over inner layer 32 in one manufacturing operation. The pultrusion process is preferably carried out utilizing open or closed bath fibre wetting. The pultrusion will typically be carried out at a speed of 1 to 10 ft/min and a temperature of 100° to 300° C.

Unmodified pultrusion results in tubular members where most of the reinforcing fibres are in alignment with the direction of tube axis. To provide strength in the transverse direction, preferably one or more layers of randomly arranged reinforcement are added to the axially oriented fibres. To accomplish this, a bidirectional polymeric fibre, such as a woven KEVLAR polyaramid material, can be used to provide axially and circumferentially arranged fibres. Alternatively, pull-winding pultrusion can be used with circumferential winding to provide randomly arranged reinforcements.

The coating 36 is applied to the tube by spray or brush application or, preferably, by extrusion on to the outer surface of the tube.

For use in a scaffold system, the tubing produced according to the present invention is cut into appropriate lengths for use as standards, ledgers, diagonals and transoms. In the preferred embodiment, each member is labelled for identification by embedding a magnetic strip in the coating of the member. The magnetic strip can be used as a tracing mechanism to be used in inventory control, or to monitor the age or amount of use of a particular member.

The resulting cross members and standards of the present invention have good tolerance to thermal stresses. They have a coefficient of expansion approximately 10 times that of steel. They are also resistant to corrosion and are non-conductive.

Figure 3:
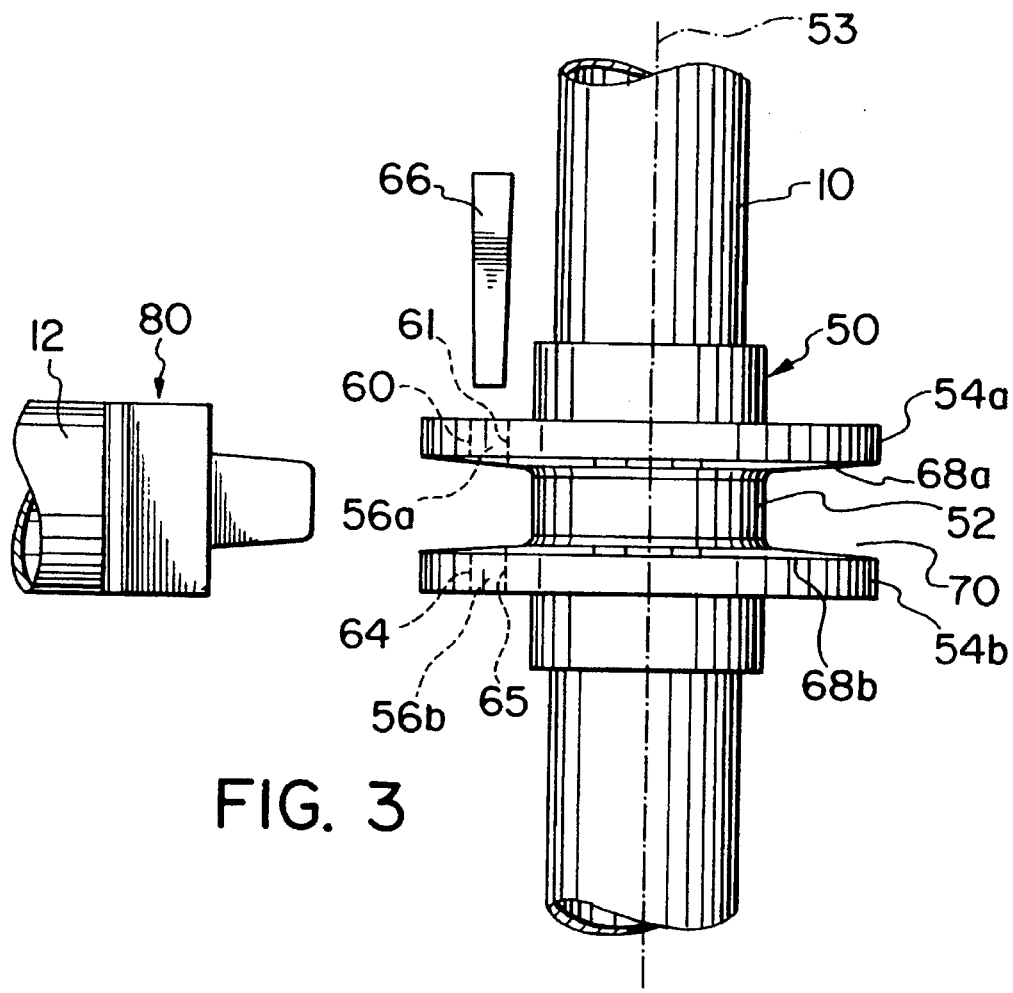
FIG. 3 is a side view of a coupling of the present invention.
Figure 4:
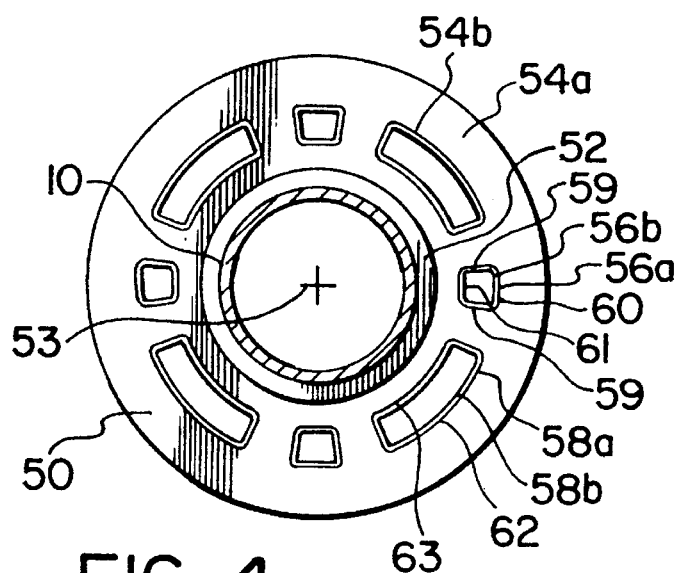
FIG. 4 is a top view of a coupling of the present invention.

The coupling 50 of the preferred embodiment, as shown in FIGS. 3 and 4, comprises a base cylinder 52 and a pair of annular flanges 54a, 54b formed integrally with and extending out from the base cylinder 52 in spaced apart relation. Base cylinder 52 of coupling 50 has an inner diameter selected to fit over and tightly engage a standard 10 in a scaffold structure. Coupling 50 acts to connect tubular cross members to the standards. As shown in FIG. 3, an adapter 80 on the end of the tubular member 12 is aligned to be locked to coupling 50 by means of a lock pin 66. Other tubular members can be attached to the coupling in the same way. Alternatively, the ends of the tubes can be stamped or moulded to a form similar to adapter 80, so that they can fit into the coupling.

Annular flanges 54a, 54b are each provided with circumferentially spaced apart apertures 56a, 56b adjacent the outer edge of each flange. In the preferred embodiment, four apertures 56a, 56b are provided spaced apart at 90° intervals about flanges 54a, 54b. Apertures 56a in flange 54a are aligned with apertures 56b in flange 54b.

In the preferred embodiment, elongated apertures 58a, 58b are also provided in flanges 54a, 54b. Elongated apertures 58a, 58b have the same radial length as apertures 56a, 56b but are extended in the circumferential direction to form an arc. Elongated apertures 58a, 58b are positioned between apertures 56a, 56b at 90° intervals around each flange and in alignment between flanges 54a, 54b. The arcuate curvature allows for some sliding adjustment of the tubular members about the standard.

Apertures 56a, 56b, 58a, 58b, are preferably provided with sides, for example 59, which extend on lines radial to axis 53 and tapered faces 60, 61, 62, 63.

As can be seen in phantom in FIG. 3, the aperture faces, for example faces 60, 61, are formed in the flange 54a to define a taper which extends continuously to the faces 64, 65 of aligned apertures in flange 54b. The coupling is placed on the standard so that flange 54a having the larger apertures (due to the direction of taper) will be disposed uppermost on the standard. The taper is preferably selected to be about 3.5° from longitudinal axis 53 of base 52. The taper provides that a likewise tapered lock pin 66 can be inserted through the aligned apertures to extend between the apertures and will remain in position. Thus, the lock pin will not be able to slip, by gravity, through the apertures to drop out of the coupling. In addition, the taper provides that the pin can be forcibly driven into the aperture to tighten the connection. It is of course possible to use non-tapered apertures if desired, but this would require use of some locking mechanism so that the lock pins could not slip out, and is not preferred.

If desired, the lock pins may be rectangular in cross-section, with the taper on the two shorter opposed sides and a non-tapered face on the two other sides. This construction prevents the lock pins from rotating in the apertures. If it is used, the tapered sides may be given a slight arcuate curvature to mate with the arcs of apertures 58a and 58b. Conveniently, apertures 56a and 56b then have a similar arcuate curvature to their sides, so that the lock pins will fit tightly.

Lock pin 66 is shaped to be inserted into apertures 56a, 56b, 58a, 58b and to fit therein in close tolerance with aperture faces 60, 61, 62, 63. The lock pin is further shaped such that, when inserted into apertures 56a, 56b, it will fit in close tolerance to sides 59. Lock pin 66 is of an adequate length to extend fully through the apertures and extend out beyond the flange on both the upper and lower sides of the coupling. The lock pins may be fully removable from the coupling or may be permanently attached thereto, as by a flexible chain, so they will not be lost when not in use.

A groove, indicated at 70, is formed by base 52 and flanges 54a, 54b. Preferably, the inner facing sides 68a, 68b of flanges 54a, 54b taper outwardly to form a substantially conical groove, as shown. The taper of inner sides 68a, 68b is preferably about 5° from the plane orthogonal to axis 53. The tapering allows an adapter 80 or 82 (not shown) of mating shape to be easily inserted into groove 70.

Figure 5:
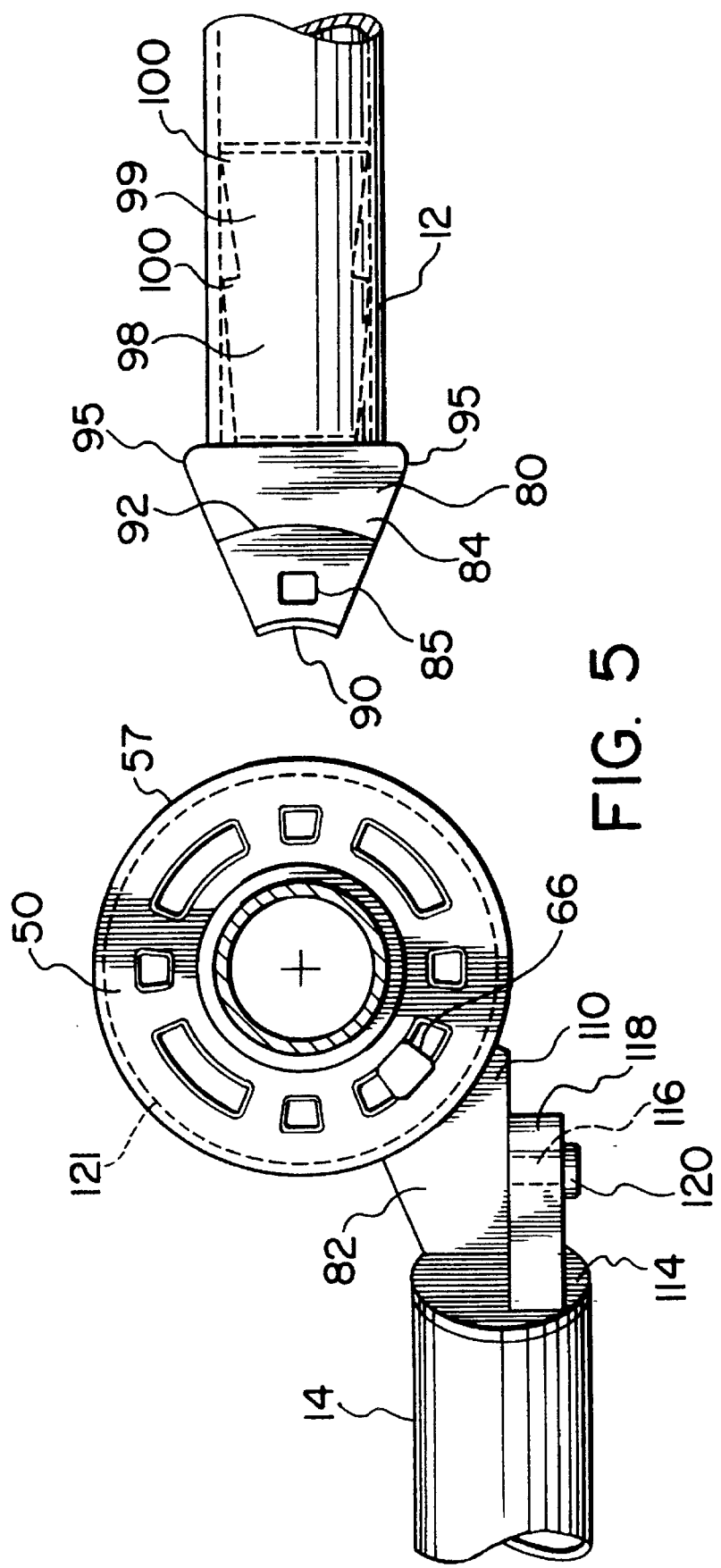
FIG. 5 is a top view of a coupling of the present invention with an adapter attached thereto and of another adapter.
Figure 6:
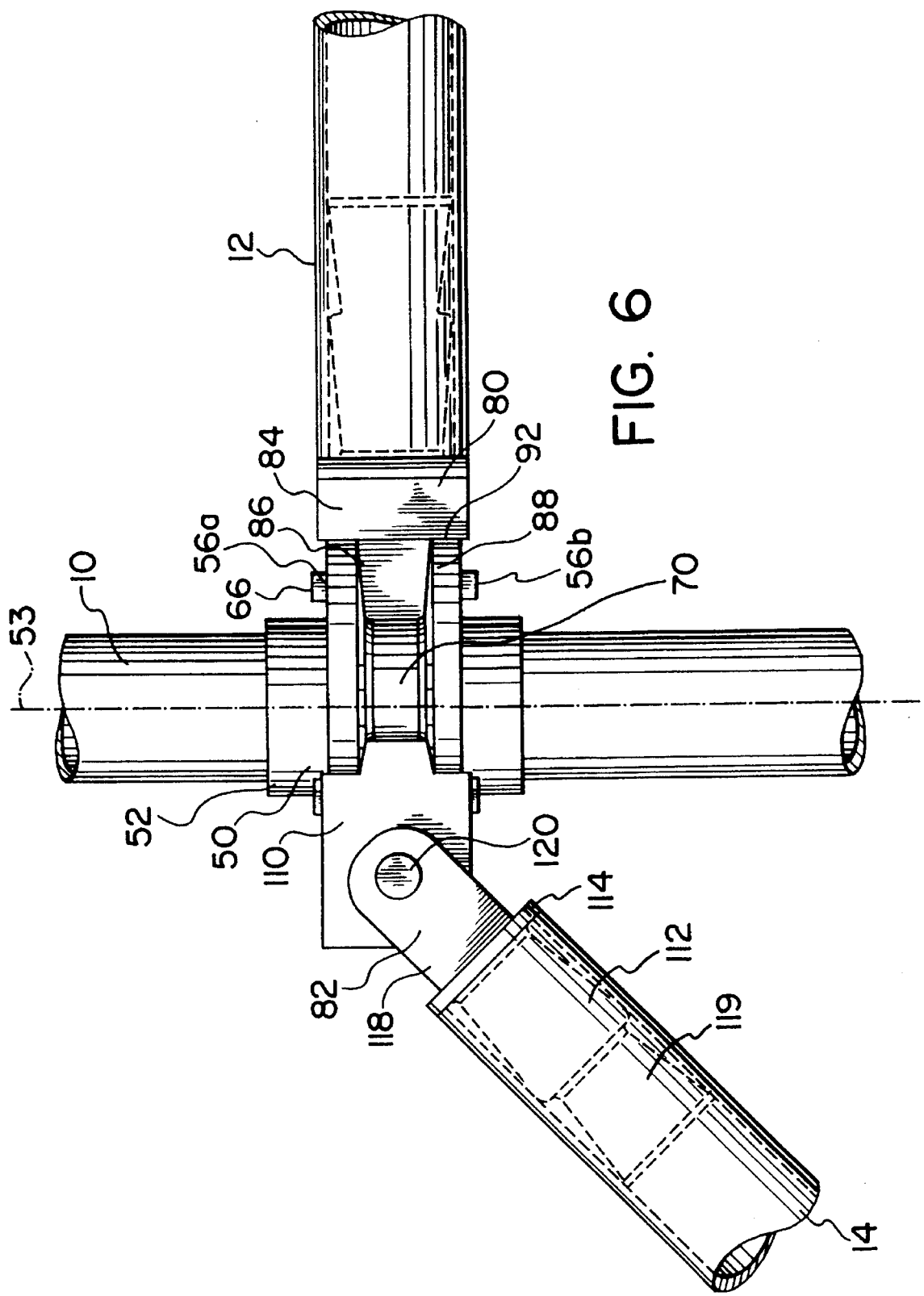
FIG. 6 is a side view of a coupling of the present invention with adapters attached thereto.

As shown in FIGS. 5 and 6, two forms of adapters are preferably employed, including an adapter 80 for attaching horizontal members and an adapter 82 for attaching diagonal members.

Adapter 80 will now be described. Each adapter is a block of material having a head portion 84 for insertion into groove 70 of coupling 50 and an outboard portion 98 for engagement with tubular cross member 12.

Adapter 80 comprises a head portion 84 for insertion into groove 70 of coupling 50. Head portion 84 defines an aperture 85 positioned and sized to correspond to the apertures of the flanges. When head portion 84 is inserted into groove 70, aperture 85 is aligned with a selected pair of apertures 56a, 56b or 58a, 58b, as desired, to form a continuous aperture. Lock pin 66 can then be inserted through the continuous aperture to hold adapter 80 in groove 70. Preferably, aperture 85 is tapered to form a smooth tapering aperture when aligned with the apertures of the flanges so that the lock pin fits into the aperture with a maximum surface area in contact with the surrounding aperture.

Head portion 84 is shaped to fit snugly into groove 70. Upper surface 86 and lower surface 88 of head portion 84 are correspondingly tapered inwardly to conform to the taper of groove 70. Front face 90 of head portion 84 is preferably arcuately curved to mate with the outer circumferential surface of base 52 and aperture 85 is positioned to align with the apertures in flanges 54a and 54b to hold front face 90 in close contact with base 52 when lock pin 66 is inserted. In this way, head portion 84 is firmly held within groove 70 and has a considerable surface area in contact with the coupling so that, in use, the stresses are distributed over the body of the adapter and transmitted to the coupling and standard. In the preferred embodiment, head portion 84 between upper surface 86 and lower surface 88 is of a thickness equal to the combined thickness of the two flanges.

Preferably, head portion 84 additionally comprises shoulders 92 which abut the outer annulus 57 of flanges 54a, 54b. Shoulders 92 are arcuately curved to conform with the outer circumferential curvature of the flanges when head portion 84 is inserted into groove 70.

Head portion 84 is forwardly tapered along its edges 95 so that a plurality of adapters can be locked to the coupling in side by side arrangement in adjacent apertures.

Adapter 80 also comprises an outboard portion 99 which extends away from head portion 84, In the preferred embodiment, the outboard portion takes the form of an insert 98 (shown in phantom) for insertion into an end of a tubular cross member 12. Cross member 14 is mounted on insert 98 in abutment with head portion 84, Insert 98 is sized to extend a suitable distance within the tubular member and has a outer diameter substantially equal to the inner diameter of the tubular member to engage the inner surface of the member. In the preferred embodiment, insert 98 is about 110 mm in length and is disposed with ribs 100 to enhance the engagement action of the insert with the tubular member. In the preferred embodiment, insert 98 will be fixed within the tubular member by means of a suitable adhesive, for example epoxy, applied between the insert and tube.

In adapter 80, insert 98 extends from head portion 84 such that when in use the tubular member 12 extends out perpendicular to centre axis 53 of base 52.

Adapter 82 will now be described. Adapter 82 is of particular use in the attachment of a diagonal 14 to coupling 50. Adapter 82 is somewhat similar to adapter 80 and comprises a head portion 110 and an outboard portion 112. However, head portion 110 and outboard portion 112 are connected by means of a pivot point to allow for variances in the angle of extension of the diagonal member from the standard. Head portion 110 is shaped to fit within groove 70 and abut the flanges in a like manner to head portion 84 of adapter 80 as described above. Outboard portion 112 has a portion 119 which corresponds to insert 98. However, outboard portion 112 also has a shoulder 114 which abuts member 14 and a journal 118 mounted on shoulder 114. A cylindrical pin 116 (shown in phantom) extends from head portion 110 to be accommodated in journal 118. Pin 116 is fattened or enlarged at its end 120 so it will not slip out of journal 118. Head portion 110 and outboard portion 112 are thereby free to rotate relative to one another. In this way, outboard portion 112 can engage a tubular member which extends at various angles relative to the axis of the base 52. Other pivotal arrangements, such as a clevis, can of course be substituted for the one shown.

The coupling member, lock pin and adapters can be formed of any suitable material such as steel or polymeric materials and by any suitable method. In the preferred embodiment, the coupling member and adapters are moulded from glass fibre filled thermoplastic such as glass reinforced nylon or vinyl ester. To increase the strength of the coupling at areas of highest stress, reinforcing fibres such as KEVLAR polyaramid can be used. For example, to provide additional strength at the annulus, a ring of KEVLAR polyaramid fibres can be embedded in the outer limits of the flange as shown in phantom in FIG. 5 at 121.

The lock pin of the preferred embodiment is formed of glass fibres in a thermoplastic or thermosetting matrix. Preferably, the lock pin is formed unidirectional E-glass in nylon.

In the preferred embodiment, the coupling is about 155 mm in diameter, having a flange thickness of 12 to 13 mm at the outer limits.

Figure 7:
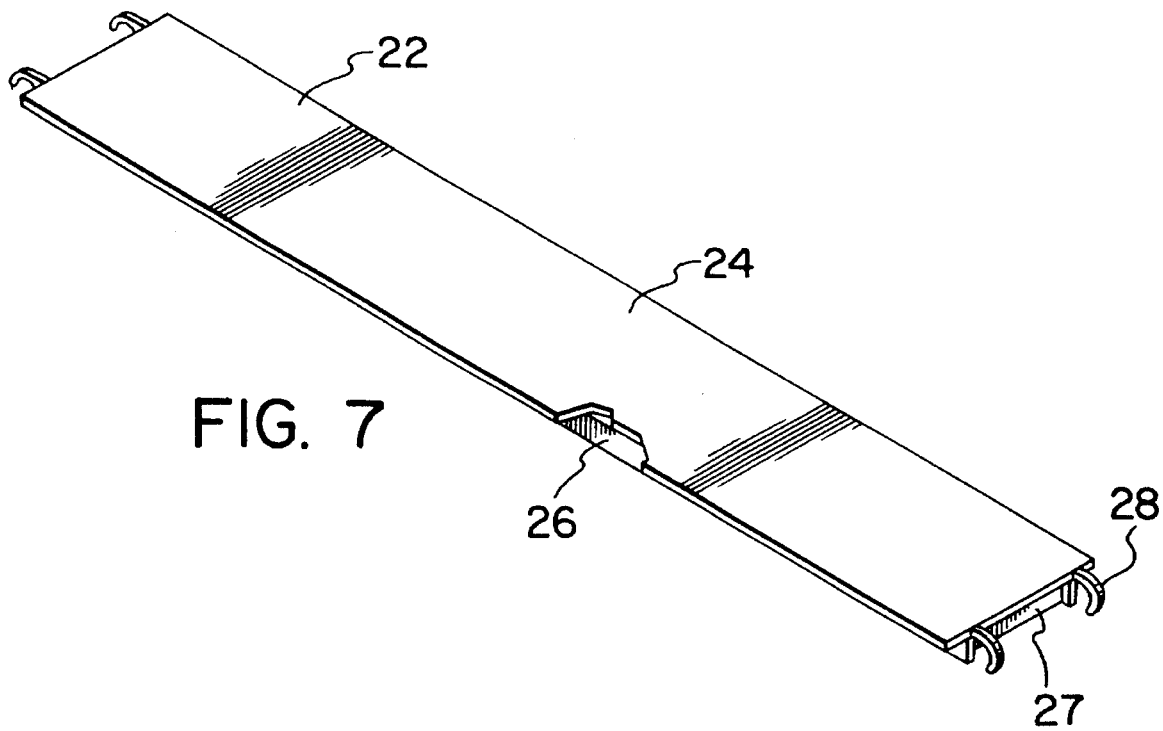
FIG. 7 is a perspective view of a platform of the present invention cut away to reveal a side rail of the platform; and, FIG. 8 is a perspective view of an alternative platform of the present invention cut away to reveal the interior of the platform.

Various platforms may be used with the scaffold system of the present invention. In a preferred embodiment, a platform 22 as shown in FIG. 7 may be employed. In an alternative preferred embodiment, a platform 40 as shown in FIG. 8 is employed.

Referring to FIG. 7, the platform 22 comprises a rigid work surface 24 supported at each side by a fibre reinforced tubular member 26 and at each end by a cross piece 27. Work surface 24 may be of any practical material such as wood or aluminum planks or plywood. Thermoplastic end hooks 28 are attached to each tubular member 26 and are shaped to hook the horizontal members of the scaffold system.

Tubular members 26 are preferably of rectangular cross-section and are formed of, for example pultruded fibreglass in vinyl ester. Work surface 24 is firmly attached to tubular members 26 by means of suitable fasteners, such as rivets or screws. Hooks 28 and cross pieces 27 are attached to the tubular members by any suitable means, such as, for example by suitable fasteners such as screws.

Figure 8:
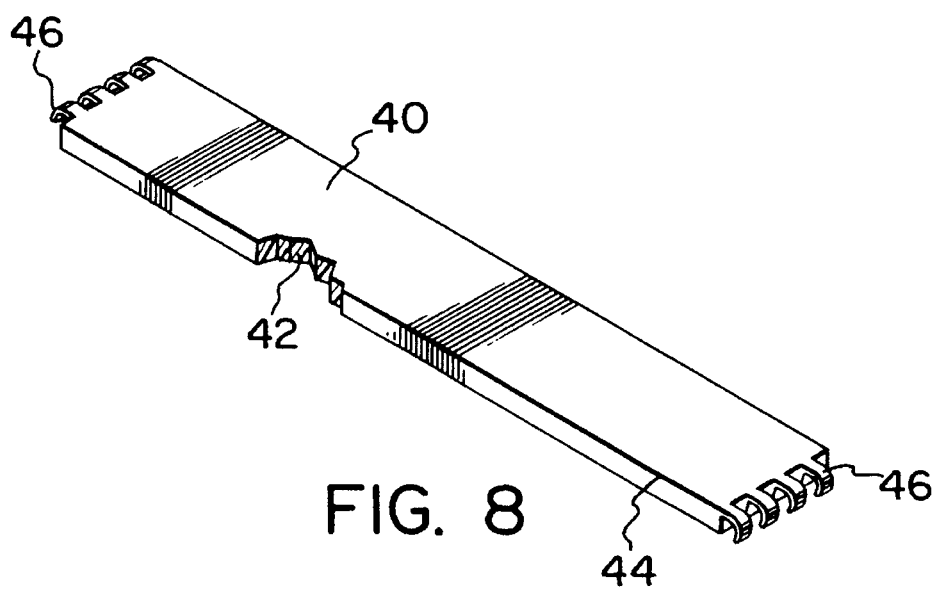

In the alternative preferred embodiment, a lightweight platform 40 of sandwich construction as shown in FIG. 8 is employed comprising a polymeric foam core 42 surrounded by a thin layer of fibre-reinforced polymer composite 44. Foam core 42 can be made in a preshaped form from any suitable open or closed cell polymer, such as polyvinyl chloride, polyester or polyurethane. The preshaped core can then act as an interior mould surface for a resin transfer moulding process in which the randomly oriented fibre-filled resin 44 is applied to the surface of the preshaped core. The fibre-reinforced polymer composite is extended out to form hooks 46. In the preferred embodiment, the foam core is formed from polyurethane, while the fibre reinforced resin is E-glass in a suitable polymer such as vinyl ester.

In the preparation of the tubular members, a plurality of coupling members are attached at suitable intervals along the standards by means of adhesives, threaded mating portions, fasteners or welding. Preferably, the couplings are attached at 0.5 m intervals by means of adhesives such as EPIBOND™ 1210A-9816 an epoxy adhesive available from Ciba Geigy. The coupling members are positioned along the standard ensuring that all apertures are aligned along the standard. Suitable adapters are inserted into each end of the tubular cross members and fixed in place by adhesives. Again, an epoxy adhesive such as EPIBOND 1210A-9816 is preferred.

In use the tubular members are extended between the standards by inserting the head portions of the adapters into the groove of the coupling, aligning the apertures and inserting the lock pin. The lock pin is wedged into place by hammering or the like, so that the face of the adapter is in close contact with the base portion. The elongated apertures are selected for use where some rotational movement of tubular cross members is desired to allow the construction of nonlinear scaffold structures, such as would be needed around curved work surfaces.

It will be apparent that many other changes may be made to the illustrative embodiments, while falling within the scope of the invention and it is intended that all such changes be covered by the claims appended hereto.

The embodiments of the invention in which an exclusive property privilege is claimed are defined as follows:

1. A coupling for use in a scaffold system to connect cross members to vertical members, the coupling comprising:
   a pair of annular flanges for mounting in a spaced apart relation on a vertical member to form a groove therebetween, each flange having an outer annulus and each flange further having formed therein at least one aperture and
   a lock pin, shaped to extend across the groove and be received in an aperture on each flange, wherein an adapted portion of a cross member can be inserted in the groove and locked into the coupling by means of the lock pin, the adapted portion having a first portion which extends into the groove and a second portion formed to substantially abut against the outer annulus of each flange.

2. The coupling of claim 1 wherein the flanges are formed integral with the vertical member.

3. The coupling of claim 1 further comprising a base cylinder having the flanges mounted thereon in spaced apart relation with their respective apertures in alignment, the base cylinder being adapted to be mounted on the vertical member.

4. The coupling of claim 3 wherein there are at least four spaced apart apertures.

5. The coupling of claim 4 wherein the apertures are formed as arcs of a circle concentric about the base cylinder.

6. The coupling of claim 1 wherein the lock pin is cuboid in cross-sectional shape.

7. The coupling of claim 6 wherein the lock pin is tapered at an end to form a wedge.

8. The coupling of claim 1 wherein the lock pin is round in cross-sectional shape.

9. The coupling of claim 1 formed from metallic material.

10. The coupling of claim 1 formed from the polymeric material.

11. The coupling of claim 10 wherein the polymeric material is glass reinforced nylon and the coupling further comprises a reinforcing ring of para aromatic polyaramid imbedded in the nylon adjacent an outlet limit of each flange.

12. The coupling of claim 1 wherein the adapted portion is an adapter connected to and extending from a cross member to be engaged in the groove of the coupling by means of the lock pin.

13. The coupling of claim 12 wherein the adapter comprises an outboard portion for engagement with the cross member and a head portion adapted for entry into the groove of the coupling and comprising an aperture positioned on the head portion to accept the lock pin therethrough.

14. The coupling of claim 13 wherein the adapter further comprises a pivot point between the head portion and the outboard portion for allowing connection to a diagonally extending cross member.

15. The coupling of claim 1 wherein the groove has a sectional shape defined by the flanges' shape and positioning and the adapted portion is shaped to fit into and substantially conform to the sectional shape of the groove.

16. A coupling for use in connection of a cross member to a vertical member, the coupling comprising:
   a first member having an upper flange and a lower flange, mountable in spaced apart relation on the vertical member to form groove therebetween, the flanges each having an outer edge and at least one aperture;
   a removable lock pin shaped to be positionable passing thought the aperture in the upper flange and the aperture in the lower flange; and
   a second member connectable to the cross member and having an end shaped to fit into the groove with an opening alignable with the apertures in the flanges to accept the lock pin, whereby to be coupled to the first member, the second member being formed to substantially abut against the outer edges of the flanges when the second member is coupled to the first member.

17. The coupling of claim 16 wherein the groove has a sectional shape defined by the flanges' shape and positioning and the adapted portion is shaped to fit into and substantially conform to the sectional shape of the groove.

18. A coupling for use in connection of a cross member to a vertical member, the coupling comprising:
   a first member having an upper flange and a lower flange, mountable in spaced apart relation on the vertical member to form groove therebetween, the flanges each having at least one aperture and the groove having a sectional shape defined by the flanges' shape and positioning;
   a removable lock pin shaped to be positionable passing thought the aperture in the upper flange and the aperture in the lower flange; and
   a second member connectable to the cross member and having an end shaped to fit into and substantially conform to the sectional shape of the groove with an opening alignable with the apertures in the flanges to accept the lock pin, whereby to be coupled to the first member.

19. The coupling of claim 18 wherein the flanges each have an outer edge and the second member is formed to substantially abut against the outer edges of the flanges when the second member is coupled to the first member.

* * * * *